United States Patent [19]
Ebata

[11] 3,940,685
[45] Feb. 24, 1976

[54] THYRISTOR-FIRING APPARATUS USING AN ACOUSTIC SURFACE WAVE DEVICE

[75] Inventor: Yasuo Ebata, Yokohama, Japan

[73] Assignee: Tokyo Shibaura Electrical Co., Ltd., Kawasaki, Japan

[22] Filed: June 3, 1974

[21] Appl. No.: 475,911

[30] Foreign Application Priority Data
June 1, 1973   Japan................................ 48-60777

[52] U.S. Cl. ............ 323/23; 307/252 B; 307/252 J; 310/8.1; 310/9.8
[51] Int. Cl.² ........................................ H02P 13/14
[58] Field of Search .......... 310/8.1, 9.8; 323/23, 25; 333/30 R; 332/46; 307/252 B, 252 J

[56] References Cited
UNITED STATES PATENTS

| | | | |
|---|---|---|---|
| 2,902,659 | 9/1959 | Ketchledge | 332/46 |
| 3,360,749 | 12/1967 | Sittig | 333/30 R |
| 3,479,572 | 11/1969 | Pokorny | 310/8.1 |
| 3,480,797 | 11/1969 | Bedford et al. | 307/252 J |
| 3,843,932 | 10/1974 | Fischman | 333/30 R |
| 3,848,140 | 11/1974 | Guermeur et al. | 307/252 B |

FOREIGN PATENTS OR APPLICATIONS

| | | | |
|---|---|---|---|
| 1,262,283 | 2/1972 | United Kingdom | 323/23 |

OTHER PUBLICATIONS

"Application of Acoustic Surface Wave to Power Electronics" by Takahashi, et al., *Pesc 74 Record, pp. 187–196.*

Primary Examiner—Gerald Goldberg
Attorney, Agent, or Firm—Cushman, Darby & Cushman

[57] ABSTRACT

A thyristor-firing apparatus using an acoustic surface wave device wherein an electric signal for firing a thyristor is converted into an acoustic surface wave and again converted into an electric signal which in turn is supplied between the gate and cathode electrodes of the thyristor. The electric signal applied to the acoustic surface wave device is obtained through amplitude modulation of a carrier signal by a control pulse, and an output from the surface wave device is rectified or demodulated to fire the thyristor.

2 Claims, 5 Drawing Figures

THYRISTOR-FIRING APPARATUS USING AN ACOUSTIC SURFACE WAVE DEVICE

This invention relates to a thyristor-firing apparatus and more particularly to a thyristor-firing apparatus adapted to simultaneously fire a plurality of series or parallel-connected thyristors included in a high voltage circuit.

Where thyristors are collectively used as a switching element in a high voltage circuit, a plurality of thyristors are generally connected in series to withstand high voltage. Where the series-connected thyristors fail to be simultaneously fired, the thyristors are likely to be damaged. Since the thyristor is placed at a high potential good electric insulation should be maintained between the firing apparatus and the gate of thyristor, otherwise leading to the damage of thyristor and thyristor firing apparatus. Once fired by a firing signal, the thyristor continues to remain conducting, even though not supplied later with a firing signal, unless a back bias voltage is impressed across the anode and cathode or the anode current is kept at a lower level than that of holding current. However, it is preferred to continue the supply of a firing signal during the period in which it is desired to keep the thyristor conducting in order to prevent the thyristor from being rendered inoperative due to variation in the anode current of the thyristor caused, for example, by load change during the control of fire.

As mentioned above, the thyristor-firing apparatus is demanded to fire a plurality of thyristors at the same time, maintain sufficient electric insulation from the thyristors and supply a thyristor-firing signal continuously as long as desired.

According to one prior art thyristor-firing apparatus, a firing pulse is supplied to the gate of thyristor through a pulse transformer. In this case, electric insulation between the thyristor and thyristor-firing apparatus is maintained by the pulse transformer. However, the pulse transformer has a low electric insulation capacity and a large stray capacitance. An attempt to elevate electric insulation capacity of the transformer would lead to an increased stray capacitance, cause a firing pulse supplied to the thyristor to rise slowly, presenting difficulties in attaining the simultaneous fire of a plurality of thyristors. Further, strong electric and magnetic fields arise near the gate electrodes of thyristors used for control of large power, resulting in the occurrence of induced noises in the pulse transformer and the erroneous fire of the thyristor. Since the pulse transformer can not deliver a D.C. component, it is difficult to supply the thyristor with an ignition signal for a relatively long period in which the ignition of thyristor should be controlled.

According to another prior art thyristor-firing apparatus, an electric firing signal is converted into a light signal by a laser oscillator. The light signal passes through optical fibers and is again converted into an electric signal by a photo-electric converter for control of the fire of thyristor. In this case, required electric insulation between the thyristor and thyristor-firing apparatus is maintained by the optical fibers transmitting the light output from the laser oscillator to the photo-electric converter. However, the photo-electric converter has a low conversion efficiency, making it necessary to provide a power amplifier between the output of the converter and the thyristor gate. The power amplifier must be at the same electric potential as the thyristor to be fired and it is therefore necessary to use a high insulated power transformer for the amplifier. However, this is disadvantageous from the standpoint of economy and miniaturization of a thyristor-firing apparatus. Further, the laser oscillator has a relatively short life time and raises problems with safety.

According to still another prior art thyristor-firing apparatus, a firing pulse is converted into a supersonic signal by a supersonic converter. This supersonic signal is again converted into an electric signal for fire of thyristor by a piezoelectric element connected between the gate and cathode electrodes of thyristor and resonating with the same frequency as said supersonic signal. In this case, required electric insulation between the thyristor and thyristor-firing apparatus is attained by electric insulation oil transmitting a supersonic signal to the piezoelectric element. However, this prior art thyristor-firing apparatus unavoidably becomes bulky due to the necessity of providing oil tubes or an oil tank in which to receive, thyristors, piezoelectric elements. This prior art thyristor-firing apparatus utilizes the resonance of the piezoelectric element, fails to have the element supplied with a broad band signal, causing an electric signal obtained from the piezoelectric element to rise slowly.

It is accordingly the object of this invention to provide a compact thyristor-firing apparatus which is electrically well insulated from thyristors, enables a thyristor-firing electrical signal to rise abruptly so that the simultaneous ignition of numerous thyristors is accomplished, and supplies the thyristors with a firing electric signal under a stable condition as long as desired.

The thyristor-firing apparatus of this invention is characterized by transmitting a firing electric signal to the gate electorde of a thyristor through an acoustic surface wave device. This acoustic surface wave device has input and output interdigitated transducers disposed on a layer of piezoelectrical material. An electrical signal delivered to the input transducer is converted into an acoustic surface wave, which travels on the surface of the layer towards the output transducer. This output transducer detects the arrival of surface wave and generates an output electric signal the same as the input electric signal. According to the thyristor-firing apparatus of this invention, a carrier signal is amplitude modulated by an amplitude modulator such as a ring modulator in accordance with a control pulse. The amplitude-modulated electric signal is power amplified and then conducted to the input transducer of the acoustic surface wave device. The output transducer gives forth an amplitude-modulated electric signal in response to acoustic surface wave produced by the input transducer. The output amplitude-modulated electric signal produced by the output transducer is transmitted to the gate of the thyristor after being rectified.

According to this invention, required good electric insulation between the thyristor and thyristor-firing apparatus is attained by the acoustic surface wave device. A relatively broad frequency component ranging from the D.C. component of an ignition control pulse to a maximum frequency component defined by the rising time of the pulse is supplied in the form of an amplitude-modulated signal to the thyristor through the acoustic surface wave device. Since the acoustic surface wave device can transmit a wide band signal, a firing electric signal supplied to the thyristor has as good a rising characteristic as the control pulse, offering advantage in effecting the simultaneous fire of numerous thyristors. Further, the acoustic surface wave device is small in size and has so high conversion efficiency as to eliminate the necessity of amplifying an output electric signal. Therefore, a circuit placed at a high potential can be simplified thus providing reduction of faults and easiness in design.

This invention can be more fully understood from the following detailed description when taken in conjunction with the accompanying drawings, in which:

FIG. 1 is a block diagram of a thyristor-firing apparatus according to an embodiment of this invention;

FIG. 2 schematically illustrates an example of a high voltage circuit including a plurality of series-connected thyristors and suitable for practical application of the thyristor-firing apparatus of this invention;

Figure 1:
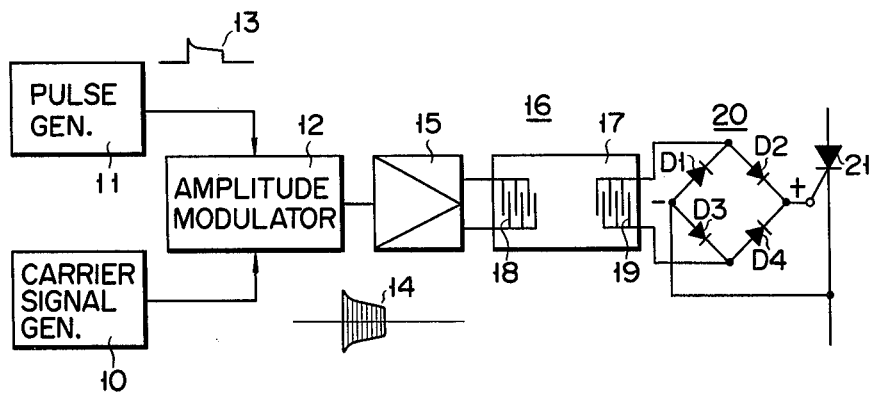

Referring to FIG. 1, a carrier signal produced by a carrier signal generator 10 with proper high frequency is amplitude-modulated by an amplitude modulator 12 according to a control pulse 13 delivered from a control pulse generator 11. The control pulse 13 is desired to have such a waveform as rises quickly and presents a peak level at the rise. Further, the control pulse should preferably have approximately the same duration time as that in which the thyristor is desired to remain conducting. When rising in a time of 0.5 microsecond, the control pulse 13 will have a frequency spectrum ranging from zero (D.C.) to 2 MHz.

The amplitude modulator 12 should preferably be the type, a supressed carrier modulator such as a ring modulator, which does not give forth a carrier signal in the absence of the control pulse or modulation signal 13. Under such condition, the amplitude modulator 12 produces an amplitude-modulated signal 14 bearing the envelope of control pulse 13. The amplitude-modulated signal 14 is amplified by a power amplifier 15 to such an extent that an output electric signal from the acoustic surface wave device 16 can fire the thyristor 21.

This acoustic surface wave device 16 comprises a substrate 17 made of piezoelectrical material, for example, lithium niobate ($LiNbO_3$) and input and output transducers 18, 19 spatially arranged on the substrate 17 in its longitudinal direction. Each of the input and output transducers 18, 19 comprises a plurality of pairs of interdigitated electrodes formed of a conductive layer such as gold. The width of each interdigitated electrode and the interelectrode distance are made equal. The width of electrode and the distance between adjacent electrodes are respectively determined by power of gate pulse to be transmitted and carrier frequency. The distance between input and output transducers is determinded by a desired withstand voltage. The acoustic surface wave device 16 is a bandpass filter whose center frequency is defined by the interelectrode distance in the input and output transducers 18, 19. Where, therefore, the bandpass filter 16 is chosen to have a center frequency of 30 MHz, then the carrier signal will likewise have a frequency of 30 MHz.

The input transducer 18 of the acoustic surface wave device 16 converts the electric energy from the power amplifier 15 into an acoustic surface wave. This acoustic surface wave travels on the surface of the substrate 17 in its longitudinal direction, namely, in a direction perpendicular to that in which the electrodes of the input transducer 18 are arranged. Accordingly, part of the acoustic surface wave is propagated to the output transducer 19, which in turn gives forth an electric signal the same as the input electric signal supplied to the input transducer 18 in response to the acoustic surface wave. By the action of acoustic surface wave device the amplitude-modulated signal supplied to the input transducer 18 is delivered from the output transducer 19. The amplitude-modulated signal from the output transducer 19 is rectified by a rectifier 20 consisting of four bridge-connected diodes $D_1$ to $D_4$. A rectified output is supplied between the gate and cathode electrodes of a thyristor 21 to render it conducting. While the rectifier 20 may be of a half wave type, a full wave rectifier as shown in the drawing is desirable from the standpoint of output power.

Though various configurations of the acoustic surface wave device 16 are already known, FIG. 1 shows a simple configuration by way of illustration. For the elevated conversion efficiency of the acoustic surface wave device 16, it is preferred that an input transducer be positioned at the center of the substrate 17 and a pair of output transducers 19 be equidistantly placed on both sides of the input transducer 18 the output signals of which are added together or that a reflector device be provided for each of input and output transducers. Application of the acoustic surface wave device enables not only a firing signal to be supplied to the gate of the thyristor as long as desired, but also the frequency components of a control pulse to be transmitted in the form of an amplitude-modulated signal, thereby supplying the thyristor with a firing signal having the same rising characteristic as the control pulse. Therefore, the thyristor-firing apparatus of this invention is particularly suitable for the simultaneous fire of numerous thyristors.

Figure 2:
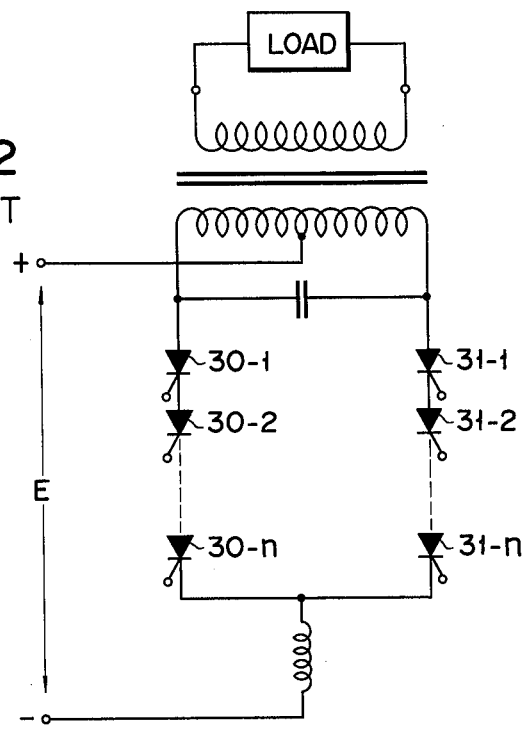

FIG. 2 shows an already known inverter for converting D.C. into A.C. voltage. Where an input D.C. voltage E is extremely high, numerous thyristors are connected in series. Numerous thyristors used jointly to act as a switching element not only with an inverter but also with any other apparatus handling high voltage are customarily connected in series. Referring to FIG. 2, first thyristors 30-1 to 30-n are connected in series, and second thyristors 31-1 to 31-n are connected similarly in series. The first thyristors 30-1 to 30-n and second thyristors 31-1 to 31-n are alternately operated by phase controlled ignition signals. In this case, it is strongly demanded that all of the series-connected thyristors be simultaneously fired. The inverter shown in FIG. 2 is already well known, description thereof being omitted.

Figure 3:
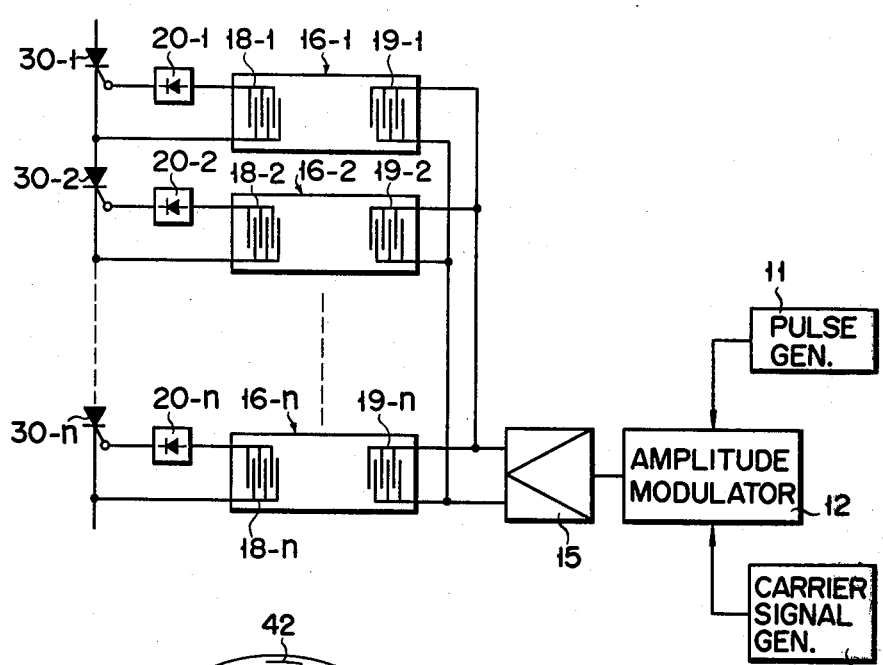
FIG. 3 shows a block diagram of this invention to simultaneously fire a plurality of series-connected thyristors.

FIG. 3 presents a block diagram according to this invention for simultaneously firing the numerous thyristors 30-1 to 30-n (or 31-1 to 31-n) of FIG. 2. The parts of FIG. 3 the same as those of FIG. 1 are denoted by the same numerals, description thereof being omitted. An amplitude-modulated signal from the power amplifier 15 is supplied to the input transducers 18-1 to 18-n of the acoustic surface wave devices 16-1 to 16-n having the same arrangement. Output signals from the output transducers 19-1 to 19-n are conducted to the gate and cathode electrodes of the thyristors 30-1 to 30-n through recitfiers 20-1 to 20-n.

Figure 4:
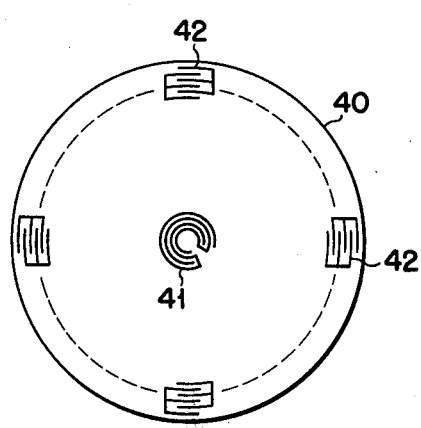
FIG. 4 is a plan view of an acoustic surface wave device suitable for the simultaneous fire of numerous thyristors.

In the embodiment of FIG. 3, an acoustic surface wave device is provided for each thyristor. However, an acoustic surface wave device shown in FIG. 4 may be used for the simultaneous fire of numerous thyristors. According to the embodiment of FIG. 4, a single input transducer 41 is located at the center of a circular substrate 40 made of piezoelectrical material. A plurality of output transducers 42 arranged on the periphery of the substrate 40 are equidistantly spaced from the center input transducer 41. The embodiment of FIG. 4 not only saves the number of acoustic surface devices used, but also enables an acoustic surface wave delivered from the center input transducer 41 to be efficiently picked up by the surrounding output transducers 42.

Figure 5:
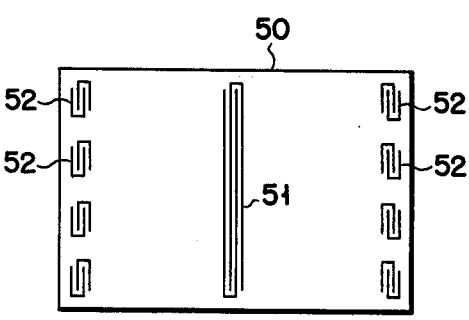
FIG. 5 is a plan view of another embodiment of the acoustic surface wave device suitable for the simultaneous fire of numerous thyristors.

FIG. 5 shows another embodiment of an acoustic surface wave device suitable for simultaneously firing a plurality of thyristors. In FIG. 5, an elongated input transducer 51 is disposed on a rectangular substrate 50 along the width thereof, and a plurality of output transducers 52 are disposed on both sides of the input transducer 51 in equidistantly spaced parallel relation to the input transducer 51. The outout transducers 52 may be disposed on only one side of the input transducer 51.

What is claimed is:

1. A thyristor firing apparatus comprising:
   a plurality of series-connected thyristors each having a gate electrode, anode electrode and cathode electrode;
   a plurality of acoustic surface wave devices each having a substrate of piezoelectric material and input and output transducer means disposed on said substrate;
   control pulse generating means;
   carrier signal generating means;
   amplitude modulating means for amplitude modulating a carrier signal from said carrier signal generating means with a control pulse from said control pulse generating means;
   a plurality of rectifier means each coupled between the gate electrode of each of said plurality of series-connected thyristors and said output transducer means and operative to apply a simultaneous firing signal to the gate electrode of each of said plurality of series-connected thyristor; and
   means for coupling said amplitude modulating means to said input transducer means of said plurality of acoustic surface wave devices.

2. A thyristor firing apparatus comprising:
   a plurality of series-connected thyristors each having a plurality of series-connected thyristors each having a gate electrode, anode electrode and cathode electrode;
   control pulse generating means;
   carrier signal generating means;
   amplitude modulating means for amplitude modulating a carrier signal from said carrier signal generating means with a control pulse from said control pulse generating means;
   an acoustic surface wave device having a substrate of piezoelectric material, a single input transducer means disposed on said substrate, and a plurality of output transducer means disposed on said substrate and equidistantly spaced from said input transducer means;
   means for coupling said amplitude modulating means to said input transducer means of said acoustic surface wave device; and
   a plurality of rectifying means each coupled between the gate electrode of each of said plurality of series-connected thyristors and said output transducer means of said acoustic surface wave device and operative to apply a simultaneous firing signal to the gate electrode of each of said plurality of series-connected thyristors.

* * * * *